Oct. 9, 1928.
A. L. CURRIER
CHUCK
Filed March 30, 1927
1,686,601
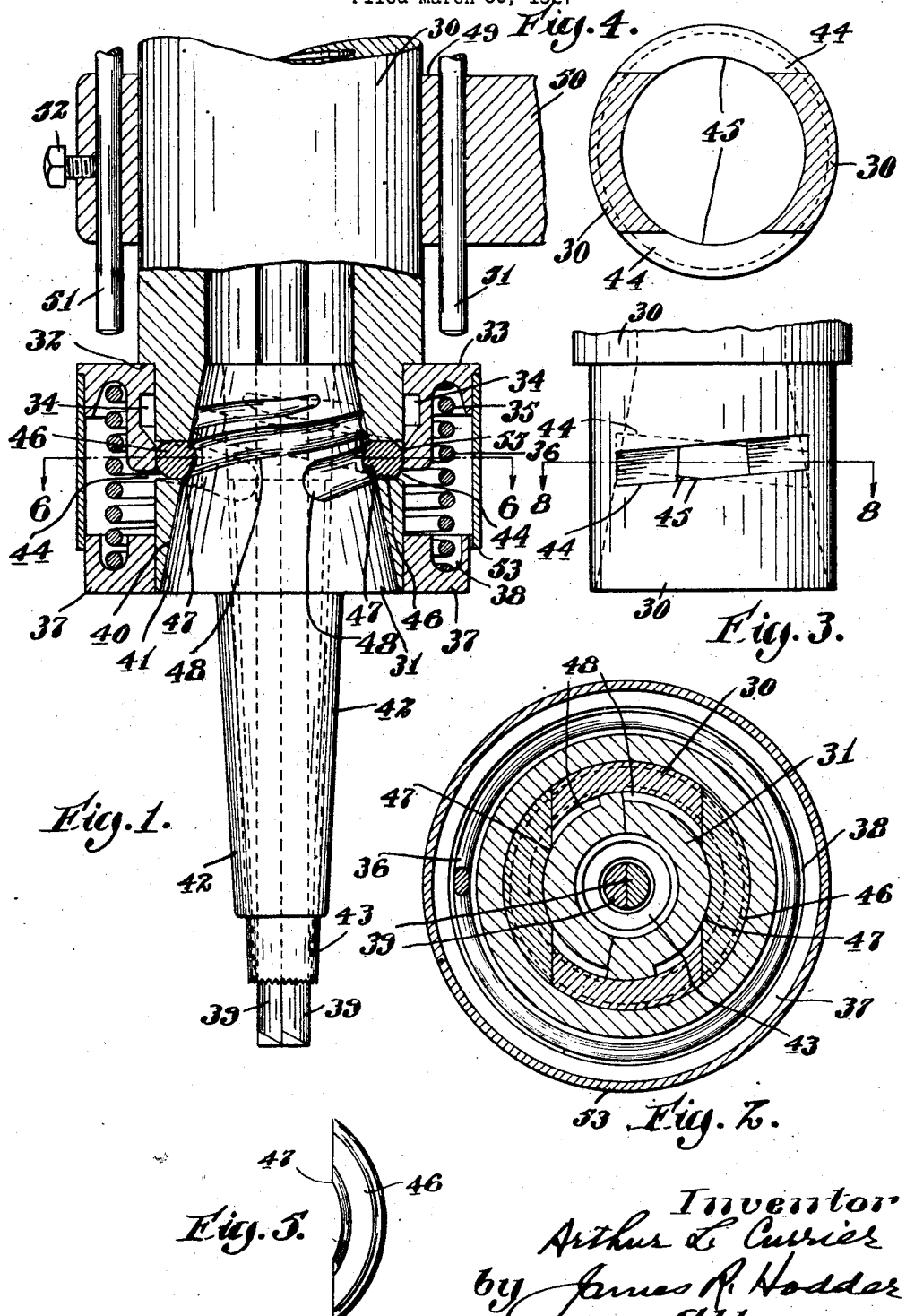
Inventor
Arthur L. Currier
by James R. Hodder
Attorney.

Patented Oct. 9, 1928.

1,686,601

UNITED STATES PATENT OFFICE.

ARTHUR L. CURRIER, OF NEW IPSWICH, NEW HAMPSHIRE.

CHUCK.

Application filed March 30, 1927. Serial No. 179,459.

My present invention is a novel and improved chuck, primarily intended for use as a saw holding chuck in button blank cutting machines.

An important feature of my present invention is the provision of a chuck to hold a saw or other cutting or holding instrumentality, which chuck will be substantially automatic in its release, as well as in the holding and engaging actions. With the provision of such a chuck, the removal and replacements of the cutting saws or other devices held by the chuck, is greatly facilitated, thereby increasing the efficiency of the particular machine in which the chuck is to be utilized. To achieve these desirable results, I preferably form the removable chuck spun and the recess or socket in the spindle to which said spun is applied, of non-wedging taper construction. With such construction, regardless of how firmly the chuck spool or spun may be seated in the spindle, jamming or wedging of the two parts will be impossible, and upon release of the various locking instrumentalities, the spool will automatically disengage from the socket or recess in the spindle dropping into the operator's hand. In this manner quick removal and ready replacement of the spool are facilitated. I believe that such novel non-wedging taper construction in the co-acting faces of the spindle and spun, is new, and I have therefore claimed the same herein broadly.

I believe that such an automatic chuck is novel, and I have therefore claimed the same herein broadly.

The chuck illustrated herein is particularly adapted for use in button blank cutting machines, wherein the steps of operation are quick, and follow each other in rapid succession, thus requiring a chuck which will be positive in action, sturdy and compact in construction and capable of facilitating removal and replacement of the cutting devices carried thereby.

The form of chuck illustrated in the present application firmly, securely, and rigidly holds the chuck spool in position, against vertical or lateral movement, and has a minimum number of moving parts, thus greatly reducing wear. The spool of the chuck, which carries the cutting instrumentalities, while thus firmly and securely held in position, is nevertheless automatically and instantly removed from the spindle by extremely simple mechanism.

In the chuck shown herein the spool may be applied to the spindle while the spindle is rotating, and the spool will automatically find its own seat in the spindle. This ability to insert the spool in the spindle while the chuck spindle is rotating, is a very important step, and one which adds greatly to the efficiency of the machine.

Further features of the invention, novel combinations of parts and advantages, will be hereinafter more fully pointed out and claimed.

Referring to the drawings illustrating preferred embodiments of my invention,

Fig. 1 is a front elevation, partly in cross section, of my novel chuck;

Fig. 2 is a cross sectional view on the line 6—6 of Fig. 1;

Fig. 3 is a fragmentary detail of the chuck spindle;

Fig. 4 is a cross sectional view on the line 8—8 of Fig. 3; and

Fig. 5 is a detail of one of the spool holding, locking, and driving members.

My novel chuck is clearly illustrated in Figs. 1 to 5 of the present drawings, wherein I utilize the spindle 30 and spool or chuck spun 31. The lower portion of the spindle 30 is indented or cut away, as shown at 32, to receive a sliding ring 33, having an inner annular groove or recess 34 and an outer recess 35 adapted to receive one end of a coiled spring 36. A lower ring 37 is secured to the spindle 30 by a driving fit, and has an annular groove 38 to receive the opposite end of said spring 36. The spindle 30 is formed hollow to permit the passage therethrough of any suitable devices, such as the holding devices 39, and is provided with a beveled face 40 at its lower interior portion, adapted to cooperate with the bevelled face 41 of the spool 31. The spool or chuck spun 31 has a depending shank 42, formed hollow and bevelled on its interior to receive a cutting or working tool, such as a saw 43. These saws are preferably formed of split spring metal in order to secure a tight friction fit within the shank 42 and spool 31, while still permitting said saws to be driven out from the shank and spool and new ones replaced. A pair of inclined recesses 44 are provided, one on each side of the spindle 30, and having central openings or recesses 45. Suitable spool holding, locking, and driving members 46, clearly illustrated in Fig. 5, are provided, one for each of the recesses 44, and so constructed and arranged that the inner surface 47 of said member will extend into the slots of apertures 45. On the spool 31 I form a pair of spiral grooves or paths 48, gradually diminishing in size from the lowermost points to the upper ends of the grooves. The bottom surfaces of these grooves 48 on the tapered or bevelled face 41 of the spool 31 are at decreasing diameters from the axis of the spool 31. The lower ends of the grooves being at greater distances from the axis. As shown in Fig. 1 the members 46 are adapted, when in operating position, to ride in said grooves, until the bevelled face 41 of the spool 31 is firmly seated against the bevelled face 40 of the chuck 30, whereupon the spool 31 will be held, locked, and driven, by these members 46.

When it is desired to remove the spool 31 for any purpose, such as the removal and replacement of the saw 43 or other cutting or operating instrumentalities, the spindle 30 is raised, by any suitable means, such for example as shown and described in my prior and co-pending application Serial No. 140,371. The spindle 30 passes through a suitable bearing 49, in an arm or bracket 50, until the ring 33 comes in contact with the stops 51, 51, adjustably held in said arm or bracket 50 and secured in adjusted position by set screws or the like 52. On contact of the ring 33 with the stops 51, the ring 33 will be forced downwardly compressing the spring 36, and bringing the annular groove 34 into alinement with the recesses 44, whereupon the weight and centrifugal force due to the speed of rotation of the spool 31, the shank 42 and component parts will force the driving and locking members 46 into the annular groove 34, whereupon the chuck spun or spool 31 will automatically drop of its own weight, into the hand of the operator.

A spring cover or dust cap 53 is provided, fitted on the ring 33 and adapted to clear and slide over the lower ring 37. This dust cap or ring 53 prevents the entrance of dirt, dust or like foreign substances into the working parts of the chuck.

When desired to replace the chuck spun in the bevelled portion of the spindle 30, the ring 33 is released from the stops 51, permitting the coiled spring to expand and forcing the locking members, by means of the lower edge 55 into the position shown in Fig. 1. Thereupon the operator merely grasps the shank 42, inserts the spool 31 in the lower open end of the spindle 30, and the spiral grooves or paths 48 will engage the inner surfaces 47 of the locking members 46, being caused to ride upwardly thereon until the chuck spool is firmly seated in the spindle 30, whereupon these members 46 will act as locking, holding, and driving members to drive the spool 31 with the spindle 30.

An important advantage of the present form of chuck is the fact that the entire operation of removing the chuck spool and replacing the same may be performed without stopping the action or rotation of the spindle 30, thus greatly expediting such replacement of the chuck spool and increasing the efficiency of the machine.

In the chuck illustrated herein, the co-acting bevelled faces of the spool and spindle, viz, 40 and 41 in Fig. 1, are formed with a non-wedging taper construction, so that the spool may ride into the recess in the spindle until said co-acting faces meet in a firm seat, and yet, upon disengagement of the locking and driving instrumentalities, the non-wedging taper construction will permit the spool to be instantly released from engagement with the spindle, and automatically drop therefrom. Such construction results in a chuck, the advantages of which will be instantly apparent, in that the spool cannot jam in the spindle, the non-wedging taper construction providing for instant disengagement of the spool from the spindle recess upon release of the locking and holding devices. Such construction also, permitting as it does quick removal, and facilitating the replacement of the spool, greatly adds to the efficiency of my novel chuck, regardless of the machine to which it is applied.

It will also be appreciated that the chuck described and illustrated herein may be utilized in horizontal operating position with equal facility and efficiency as in the vertical position herein illustrated, such veritcal position being for illustrative purposes only. This ability of the chuck to operate in any position, greatly broadens the field of utility thereof, enabling it to be embodied in many different machines.

It will be appreciated that while I have illustrated my novel chuck herein constructed and arranged for use in a button blank cutting machine of the type illustrated in my prior and co-pending application, I am not limited thereto, but my novel chuck may be utilized in any form of machine wherein quickly attached, automatically removable and positively acting chucks of this type are desired. It will also be appreciated that I may vary the size, shape, and arrangement of parts, within reasonably wide limits, without departing from the spirit of the invention.

My invention is further described and defined in the form of claims as follows:

1. A chuck comprising a rotatable spindle having a tapered opening therein, a tapered tool holding spool adapted to enter said tapered opening, spiral grooves in said spool, arcuate holding, locking and driving members in said spindle, to cooperate with and engage said spiral grooves, and means to permit radial disengagement of said members from locking engagement to permit release of said spool.

2. A chuck, comprising a rotating spindle having inclined recesses therein, holding, locking, driving members in said inclined recesses, a tool holding spool, spiral grooves in said spool, a relatively movable ring around said spindle, a groove in said ring to accommodate one portion of a coiled spring, a second ring of less diameter than said first ring affixed to said spindle and having a groove to accommodate the other end of said spring, a spring cover and dust ring affixed to said movable ring, and outside of said fixed ring, said movable ring, having a groove on the inner side thereof, said spring being compressible to bring said inner groove in the movable ring into alinement with the said inclined recesses in the spindle, to permit disengagement of said members from the spiral grooves in said spool, and permit release of said spool.

3. A chuck, comprising a rotating spindle having diametrically opposite inclined recesses therein, arcuate holding, locking, driving members in said inclined recesses, a tool holding spool, spiral grooves diametrically opposite and of increasing depth from one end to the other in said spool, a relatively movable ring around said spindle, a groove on the inner surface of said movable ring, said ring normally holding said members in the spiral grooves, and movement of said ring bringing said groove on its inner surface into alinement with said inclined recesses in the spindle to permit disengagement of said members from the spiral grooves in said spool and permit release of said spool.

4. A chuck, comprising a rotating spindle having inclined recesses therein, arcuate holding, locking, driving members in said inclined recesses, a tool holding spool, spiral grooves in said spool, a relatively movable ring around said spindle, a second ring affixed to said spindle, a groove on the inner surface of said movable ring, means normally holding said rings separated but permitting movement of said first ring toward said second ring, movement of said first ring bringing said grooves on its inner surface into alinement with said inclined recesses in the spindle to permit disengagement of said members from the spiral grooves in said spool and permit release of said spool.

5. A chuck, comprising a rotating spindle having inclined recesses therein, arcuate holding, locking, driving members in said inclined recesses, a tool holding spool, spiral grooves in said spool, a relatively movable ring around said spindle, a groove in said ring, a second ring affixed to said spindle, a spring disposed between said rings and having its ends within said grooves in said rings, a groove on the inner surface of said movable ring, movement of said ring bringing said groove on its inner surface into alinement with said inclined recesses in the spindle to permit disengagement of said members from the spiral grooves in said spool and permit release of said spool.

In testimony whereof, I have signed my name to this specification.

ARTHUR L. CURRIER.